United States Patent [19]

Martin

[11] Patent Number: 5,226,165
[45] Date of Patent: Jul. 6, 1993

[54] DATABASE SEARCH PROCESSOR FOR REAL-TIME ADAPTIVE SEARCHING BASED ON REQUEST AND DATA STRUCTURE

[75] Inventor: Michael W. Martin, Camberley, United Kingdom

[73] Assignee: International Computers Limited, London, England

[21] Appl. No.: 735,031

[22] Filed: Jul. 24, 1991

[30] Foreign Application Priority Data

Oct. 24, 1990 [GB] United Kingdom ............... 9023096

[51] Int. Cl.[5] .................................................. G06F 15/40
[52] U.S. Cl. ............................... 395/600; 364/282.1; 364/261; 364/261.2; 364/262.9; 364/280.5; 364/DIG. 1
[58] Field of Search ................... 395/800, 600, 700

[56] References Cited

U.S. PATENT DOCUMENTS

| | | | |
|---|---|---|---|
| 4,384,325 | 5/1983 | Slechta, Jr. et al. | 364/200 |
| 4,464,718 | 7/1984 | Dixon et al. | 364/200 |
| 4,531,186 | 7/1985 | Knapman | 364/300 |
| 4,829,427 | 5/1989 | Green | 364/300 |
| 4,876,643 | 10/1989 | McNeill et al. | 364/200 |
| 5,050,075 | 9/1991 | Herman et al. | 364/200 |
| 5,073,854 | 12/1991 | Martin et al. | 364/425 |
| 5,091,852 | 2/1992 | Tsuchida et al. | 395/600 |

FOREIGN PATENT DOCUMENTS 1497676 10/1974 United Kingdom ............... 364/200

Primary Examiner—Thomas C. Lee
Assistant Examiner—Timothy L. Philipp
Attorney, Agent, or Firm—Lee, Mann, Smith, McWilliams, Sweeney & Ohlson

[57] ABSTRACT

A dedicated search processor searches data retrieved from a disc file in response, to search requests from a host processor. The search processor consists of a programmable processor. The processor has a code generator which generates a machine-code search program specifically tailored to the particular combination of search request and data structure, and containing mainly in-line sequences of instructions. The search program can therefore be executed very rapidly, allowing a high search rate to be sustained.

6 Claims, 4 Drawing Sheets

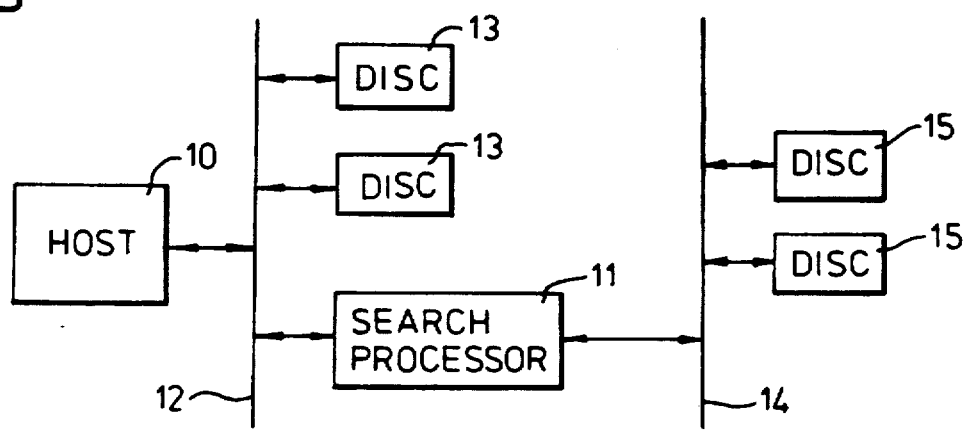
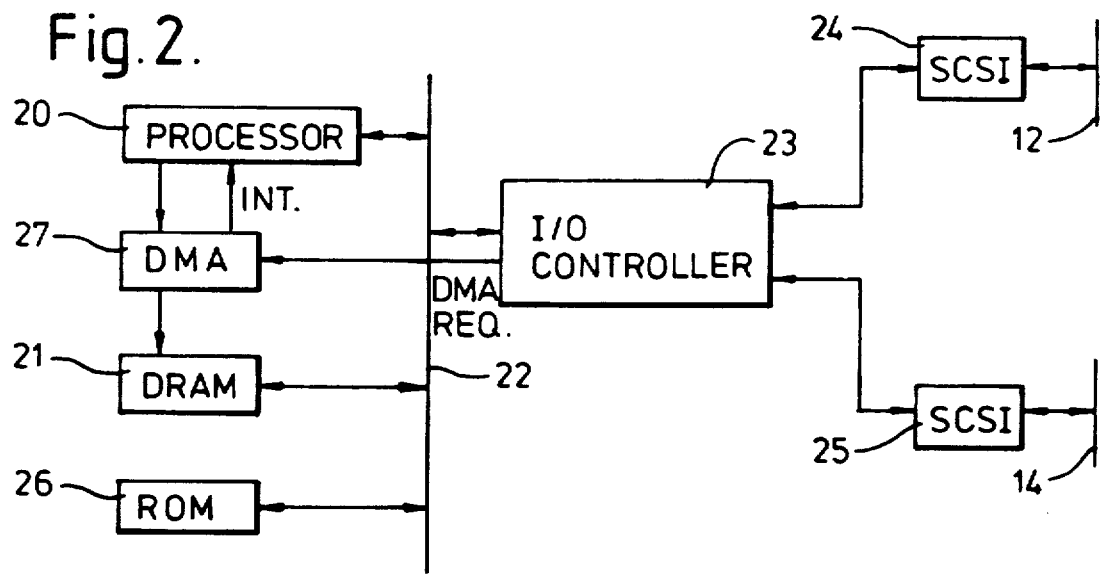

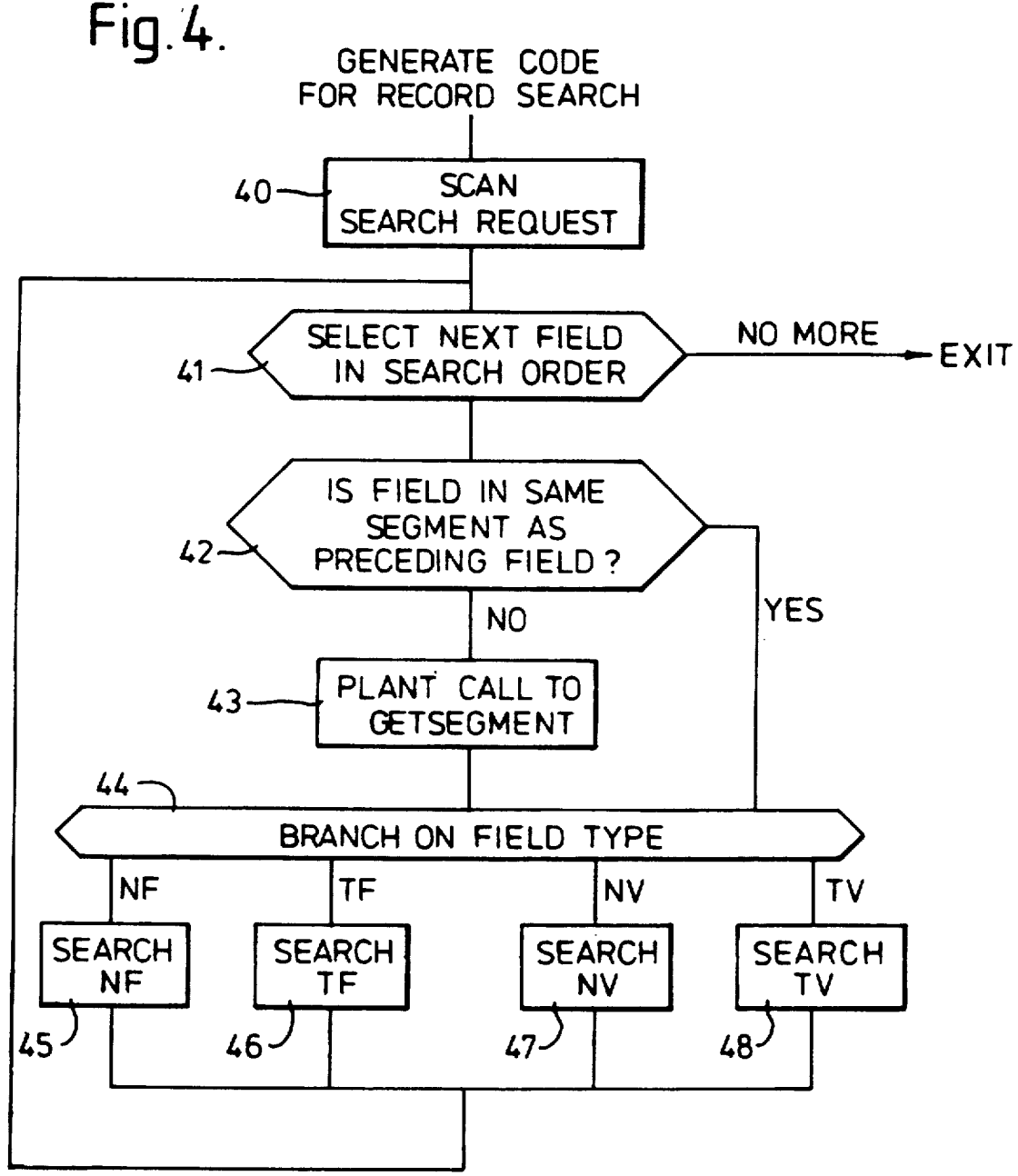

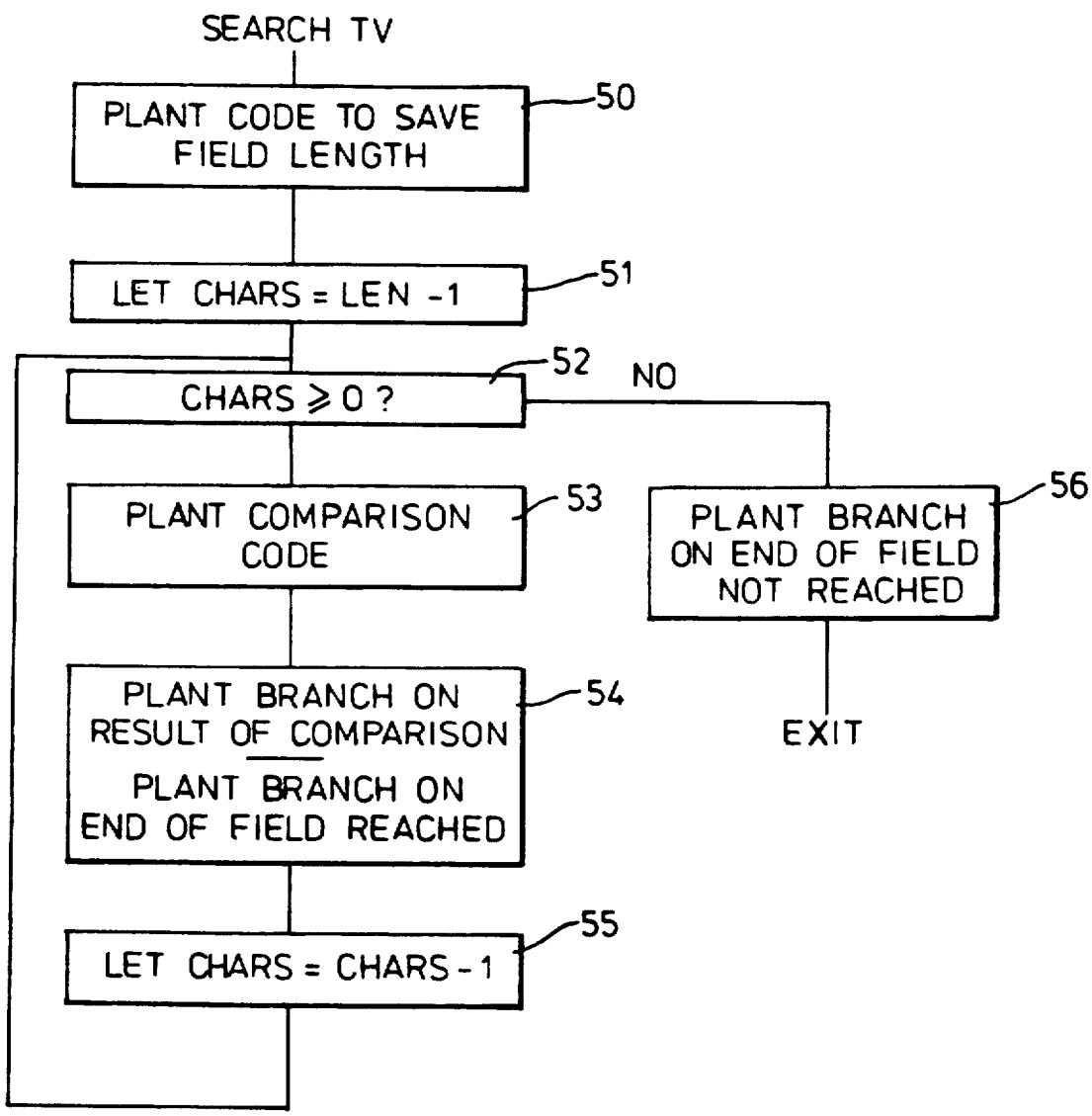

DATABASE SEARCH PROCESSOR FOR REAL-TIME ADAPTIVE SEARCHING BASED ON REQUEST AND DATA STRUCTURE

BACKGROUND TO THE INVENTION

This invention relates to a database search processor, and to a data processing system including such a search processor.

It is known to provide a dedicated search processor for performing searches through a database in response to search requests from a main (host) processor. For example, the search request may ask the search processor to find records in which specified fields match a specified search value. The advantage of using a dedicated search processor is that it reduces the load on the host, leaving the host free to perform other tasks. One example of a search processor is described, for example, in British Patent No. 1 497 676.

The search processor in the above reference consists of special-purpose logic, designed for the sole function of performing searches. Such a special-purpose logic can be very fast in operation, but is expensive to design and lacks flexibility. It would be more convenient if a search processor could be implemented using a general-purpose processor (e.g. a commercially available single-chip processor), suitably programmed to perform the required search function. However, there are problems in achieving a sufficiently high search rate using a general-purpose processor. For example, consider the case where it is required to perform an on-the-fly search on data from a disc file i.e. to search the data in real time as it arrives from the disc. The rate of data from a disc file is typically 2-4 million bytes/second. It has been found to be very difficult in practice to write a program which can search at this data rate and which is general enough to handle a variety of different search requests and a variety of different record formats.

The object of the present invention is to overcome or alleviate this problem.

SUMMARY OF THE INVENTION

According to the invention, there is provided a database search processor comprising
(a) A programmable processor,
(b) means for receiving data to be searched, the data having a specified data structure.
(c) means for receiving a search request, and
(d) code generator means responsive to the search request, for generating a machine-code search program, specific to the particular search request and data structure, for searching the data.

It can be seen that, instead of providing the search processor with a single, general-purpose search program which would have to take account of all possible search requests and all possible variations in record structure, the invention provides a run-time code generator which generates a special-purpose search program unique to the particular combination of request and record structure. As a result, the generated search program can be optimised to perform searches faster than a general purpose program. In effect, complexities introduced by possible variations in request and record structure are dealt with once only for each search request, before the actual search commences. Thus, it is not necessary for the processor to waste time considering these variations when the search is actually being performed.

Preferably, the generated program consists of an in-line sequence i.e. a sequence of instructions without any loops. Thus, for example, instead of having a loop which is repeated n times to search n bytes of data in a field, the generated program includes n separate sub-sequences, one for each byte comparison. The use of in-line sequences contributes to faster operation of the search processor.

Preferably also, the values to be searched for are represented by literal values in the generated program. This avoids the need for memory accesses to retrieve the search values at run time, and hence further speeds up the execution of the search.

BRIEF DESCRIPTION OF THE DRAWINGS

FIG. 1 is a block diagram of a data processing system a search processor.

FIG. 2 is a block diagram showing the search processor in more detail.

FIG. 4 is a flow chart of a code generator for generating a search program.

FIG. 5 is a flow chart showing part of the code generator in more detail.

DESCRIPTION OF AN EMBODIMENT OF THE INVENTION

Figure 3:
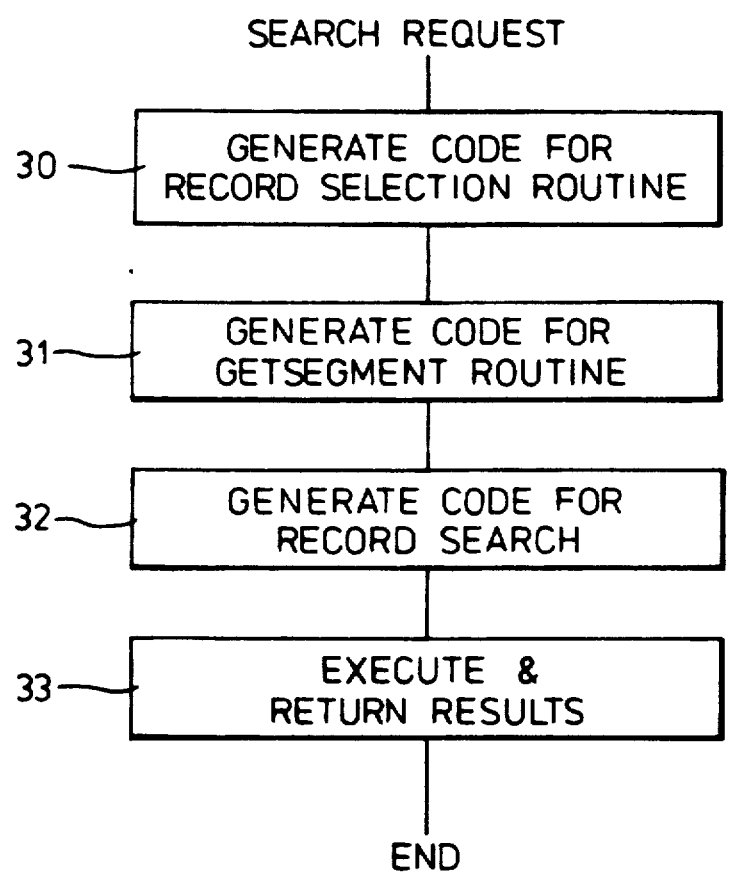
FIG. 3 is a flow chart showing the operation of the search in response to a search request.

One data processing system in accordance with the invention will now be described by way of example with reference to the accompanying drawings.

Referring to FIG. 1, the data processing system comprises a host processor 10 and a search processor 11. The host processor interfaces with the search processor by way of a bus 12 which, in this example, is a standard SCSI (small computer systems interface) bus. The bus 12 also has one or more disc drive units 13 connected to it, these being accessible either by the host processor or the search processor.

The search processor 11 is also connected by way of a second SCSI bus 14 to further disc drive units 15. These further disc drives are thus directly accessible by the search processor. They can also be accessed indirectly by the host processor, by way of the search processor, which passes messages between the two SCSI busses 12 and 14.

Each of the processors 10, 11 and the disc drives 13, 15 includes standard SCSI interface logic for receiving and sending data and messages over the SCSI busses.

The disc drives 13, 15 hold a relational database structure consisting of one or more files. Each file consists of a sequence of records, each of which consists of one or more fields. Each field may be of one of a number of different types, representing, for example a numerical value, text, date, time etc. Also each field may be either fixed length or variable length. In the case of a fixed length field, the length of the field is the same in all records, whereas in the case of a variable length field it may vary from record to record. The length of the variable length field may be indicated by a length code at the start of the field or a terminating zero.

Thus, for example, the possible field types include the following:
 NF: numerical fixed length.
 TF: text fixed length.
 NV: numerical variable length.

TV: text variable length.

For example, a record in a personnel file may include the following fields.

| Field No. | Contents | Type |
|---|---|---|
| 1 | personnel number | NF |
| 2 | name | TV |
| 3 | initials | TV |
| 4 | department | TV |
| 5 | job | TV |
| 6 | salary | NF |

The file is stored as a set of pages, each of which holds a number of records.

The file has an associated file description specifying the structure of a record in the file. All the records in the file have the same structure. The description contains the following information for each field in the record format:
  type of field (NF, TF, NV, or TV)
  length of field (for fixed length fields only)
  field reference.

To facilitate searching through the records, the fields are considered as being grouped into segments where segment is defined as a sequence of fields containing no more than one variable length field, terminating on the variable length field (if any).

For example, a record FFVFVVF (where F represents a fixed length field and V represents a variable length field) is grouped into segments as follows:

| Segment 1 | Segment 2 | Segment 3 | Segment 4 |
|---|---|---|---|
| FFV | FV | V | F |

In operation, the host processor 10 performs the main processing workload of the system. When the host requires a database search to be performed, it sends a search request to the search processor 11 over the SCSI bus 12.

The search request specifies that a search is to be made on a particular file. It contains a search specification, consisting of a sequence of items of the form:

(field COMP value)

where "field" is a reference to a data field (segment and offset) to be searched, "value" represents a value which is to be compared with the data field, and "COMP" represents the comparison operation (e.g. equals, greater than, less than) to be performed. Each item of the search specification has a label. Also each item of the search specification is followed by two jump labels, one for the comparison result TRUE and one for FALSE. These labels can be used to link the items together so as to specify complex AND/OR combinations of comparison operations.

The search processor 11 executes the search request by accessing the required data file from one of the disc files 13, 15 and performing the specified comparisons on each record. The results of the search are then returned to the host processor, for example by returning all records that match the search specification.

Search processor

Referring now to FIG. 2, this shows the search processor 11 in more detail.

The search processor includes a single-chip processor 20 which in this example is a RISC (reduced instruction set computer) chip capable of executing machine-code instructions at the rate of 15 million instructions/second. The instructions include arithmetic, logic, comparison, and branch instructions. When a comparison instruction is executed, one of a number of internal flags in the processor is set according to the result of the comparison. Those flags include the following: EQ (equals), GT (greater than), LT (less than) and NE (not equal).

The processor 20 accesses a 1 Mbyte DRAM (dynamic random access memory) 21 by way of a 32-bit bus 22. The DRAM holds programs and data for the processor 20. A predetermined area of the DRAM is reserved as a buffer area, for holding a number of pages of data from the disc files.

The bus 22 also connects to a ROM (read-only memory) 26, and an I/0 (input/output) controller 23 which communicates with two SCSI controller chips 24, 25. The controller chip 24 is connected to the first SCSI bus 12, while the controller chip 25 is connected to the second SCSI bus 14. The ROM 26 holds bootstrap programs for initialising the search processor when it is powered up or reset.

The search processor also contains a DMA (direct memory access) chip 27 which can access the DRAM 21 directly, in response to DMA requests from the I/O controller. This allows input data from the discs to be loaded directly into the buffer area of the DRAM, without intervention of the processor 20. This leaves the processor free to perform other tasks, such as searching data already loaded into the buffer area. When a complete page of data has been loaded into the DRAM, the DMA produces an interrupt signal to the processor, to inform it that a new page is now ready to be processed.

Search request processing (Host)

When the host generates a search request, it performs the following actions.

First, the host fetches the file descriptor of the file to be searched. The host uses this file descriptor to create a number of descriptor arrays, defining the record structure. These arrays hold the following information for each field in the record.
  field type (NF etc.)
  length of field (for fixed length fields)
  the segment in which the field is located
  the offset of the field (i.e. the position of the field relative to the start of the segment in which it is located).

In addition, the host creates arrays to store the following information for each segment:
  whether there is a fixed length field in the segment.
  whether there is a variable length field in the segment.

The host then assembles a Task Specification Block (TSB) and passes it to the search processor. The TSB contains the following information needed to perform the search:
  the segment description of record
  the search specification within record
  what is to be retrieved.

Search request processing (Search processor)

When the search processor receives this TSB, it runs a code generator which generates a machine-code search program for executing the search request. The search program is assembled ("planted") in the DRAM, ready for execution by the processor. The code-generator consists of three sections as shown in boxes 30, 31 and 32 as follows.

(Box 30). The first section of the code generator plants a machine-code routine for selecting successive records from the buffer area. This routine is often independent of the particular search request and record structure.

(Box 31). The second section of the code generator plants a machine code routine, GETSEGMENT for selecting the start position of individual segments in the record. This code is dependent upon both the record structure and the fields being searched. The start position of a segment is determined by scanning each segment in the record in turn until the start of the desired segment is reached. The routine is optimised so that if a segment is 'passed over' during the scan, its start position is stored if (and only if) it may be needed in a subsequent field comparison. Also the entry address of the routine is linked to the position of the last exit from the routine within the record. In this way, it is possible to ensure that the record only gets passed over once regardless of the number of fields involved in the comparison.

In many database structures the efficiency of selecting field start positions is as important as the efficiency of doing field comparisons.

(Box 32). The third section of the code generator plants a machine-code routine for searching the currently selected record. This routine is specially tailored to the particular search request and the types of fields to be searched. It consists of an in-line sequence of machine-code instructions (i.e. with no loops, although it normally has branches), containing the bytes of the search values as literal values.

(Box 33). When code generation is complete, the search processor calls and executes the generated search code. The results of the search are returned to the host, in parallel with the search proceeding.

Search routine generation

Referring now to FIG. 4, this shows in more detail the section of the code generator for generating the record search code (Box 32).

(Box 40). The code generator first scans the search request so as to find the order in which fields are to be searched, and the search value for each field.

(Box 41). The code generator then selects each field in turn, in the specified search order. If all the fields have been selected, the generation of the search routine is complete, and an exit is made.

(Box 42). For each field, the code generator checks whether the currently selected field must be in the same segment as all field comparisons that can immediately precede it at run-time. If so, a jump is made to box 44 below.

(Box 43). If the current field is not in the same segment, code is planted to call the GETSEGMENT routine specifying the currently selected segment.

(Box 44). A branch is now made according to the type e.g. (NF, TF, NV or TV) of the current field.

(Boxes 45-48) According to the field type, one of a number of code generator routines (e.g. SEARCH NF, SEARCH TF, SEARCH NV and SEARCH TV) is performed. The selected routine plants a sequence of machine-code instructions, specially tailored to the particular field type, for comparing the search value with the data field. This code will include branches as required e.g. for branches to the next record if the comparison for this record indicates a "miss". The code generator then returns to box 41 above and repeats this loop until all the fields in the defined record structure have been considered.

As an example to illustrate the operation of the code generator, consider a search request which specifies that the fields of each record are to be searched in the order 3, 2, 4, 1 and all must equal their search values, (i.e. a Boolean AND). It is assumed that field 1 is in segment 1, fields 2 and 3 in segment 2, and field 4 in segment 3.

The code-generator will generate a machine-code sequence of the following form:
  Call GETSEGMENT to get pointer to segment 2
    (only unravels record up to start of segment 2)
  Search field 3
  If NE, branch to next record
  Search field 2
  If NE, branch to next record
  Return to GETSEGMENT to get pointer to segment 3 (only unravels up to start of segment 3)
  Search field 4
  If NE, branch to next record
  Return to GETSEGMENT to get pointer to Segment 1 (retrieves stored start position)
  Search field 1
  If NE, branch to next record.

It can be seen that, although the code generator program of FIG. 4 comprises a loop, the generated machine code is strictly in-line code. That is, instead of consisting of a loop that is repeated four times for the four fields to be search, the machine code comprises four separate search sequences, one for each field.

It should also be noted that it is not necessary to get a segment pointer between the search sequences for fields 3 and 2, since these fields are both in the same segment (segment 2).

Finally, it should be noted that each of the steps "search field 3" etc in the above example consists of a sequence of machine-code instructions generated by the appropriate one of the code generator routines 45-48.

Generation of Search TV sequence

Referring now to FIG. 5, this shows the search TV code generator routine (box 48) in more detail. This routine plants a sequence of machine-code instructions specifically tailored for searching a variable-length text field.

(Box 50) Plant code that will get and save the actual length of field from the disc data.

(Box 51) An index value CHARS is set to LEN-1 where LEN is the length of the search value.

(Box 52) The value of CHARS is tested.

(Box 53) If CHARS is greater than or equal to zero, then the code generator plants a machine-code instruction to compare the next character of the data field with the next character of the search value. The address of the data field is calculated by adding the offset value of the field to the start address of the segment.

The planted code contains the first character of the search value as a literal value, so that it is not necessary for the search processor to look up the value of this character at run-time.

(Box 54) The code generator then plants machine code to branch on the result of the comparison. Depending upon how the search has been specified. This may be a branch to get next record, a forward branch to another field comparison or a branch to return a hit record.

A test and branch on end of field encountered is also planted. Again depending upon the search specification this may be a branch to get the next record, a forward branch to another comparison, or a branch to return a hit record.

(Box 55) The index CHARS is decremented by 1 and the code generator loops back to box 52).

(Box 56) When CHARS becomes less than zero, the code generator plants machine code instructions to perform an appropriate branch depending on the comparison results for this field on the search specification. For example, this may include a branch to the code for the next record, a forward branch to another comparison, or a branch to return a hit record. If the branch is to the comparison immediately following the current one, no code is generated, so that a drop through occurs.

As an example, to illustrate the operation of the compiler, consider the case where the "name" field in the personnel file described above is to be compared for equality with the search value "SMITH". The search TV routine will generate machine code of the following form.

Compare first character of field with "S"
Branch if not equal, to get next record
If end of field, branch to get next record
Compare second character of field with "M"
Branch if not equal, to get next record
If end of field, branch to get next record.
---
Compare fifth character of field with "H"
Branch if not equal, to get next record
If not end of field, branch to get next record
(only get to here if comparison succeeds).

It should be noted that the machine-code sequence is in-line. Thus, instead of having a loop which is performed five times for the five characters of the search value, five separate comparison operations are specified. Also the characters of the search value are explicitly included in the generated code as literal values.

The code generated for comparison other than for equality (e.g. not equals, greater than, less than) are similar and need not be described in detail.

The code generator routines (boxes 46–48) for generating search sequences for other field types (NF, TF, NV) are similar and need not be described in detail.

Other features of the system

Preferably the code generator program is dynamically down-loaded into the search processor from the host. The host may contain a number of different code generators, one for each of a number of different database types (e.g. structured, or raw text), and the host down-loads the appropriate one of these code generators before it issues any search requests for a particular database.

Preferably also, the code generator may be written in a high-level language, such as C, with the code to be generated expressed as embedded assembler mnemonics, containing high-level language variables. Each machine-code instruction may be part-compiled off-line, leaving just the run-time insertion of dynamic variables. This reduces the run-time overhead of code generation.

I claim:

1. A database search processor comprising:
 a) a programmable processor,
 b) means for receiving data to be searched, the data having a specified data structure,
 c) means for receiving a search request, said search request including a search value comprising a plurality of characters, and
 d) code generator means responsive to the search request, for generating a machine-code search program, specific to the particular search request and data structure, for searching the data, said code generator means comprising means for scanning each said character in said search value and, for each said character, generating a machine-code comparison instruction containing that character as a literal value, and machine-code branch instruction for branching on the result of said comparison instruction, thereby generating an in-line loop-free sequence of machine code for comparing said search value with the data to be searched.

2. A database search processor according to claim 1 wherein the data comprises a series of data records, each said record having a specified record structure, and the machine-code search program generated by the code generator is specific to that record structure.

3. A database search processor according to claim 1 wherein said machine-code search program includes a sequence of instructions for locating the start of each field to be searched within the record.

4. A database search processor according to claim 1 in combination with a data file store comprising at least one disc file unit, for storing the data to be searched.

5. A data processing system comprising:
 a) a host processor,
 b) a data file store for storing a series of data records representing a database to be searched, each said record having a specified record structure,
 c) a database search processor comprising a programmable processor, means for receiving a search request from the host processor said search request including a search value comprising a plurality of characters, and code generator means responsive to the search request, for generating a machine-code search program, specific to the particular search request and data structure, for searching data retrieved from the data file store, said code generator means comprising means for scanning each said character in said search value and, for each said character, generating a machine-code comparison instruction containing that character as a literal value, and a machine-code branch instruction for branching on the result of said comparison instruction, thereby generating an in-line loop-free sequence of machine code for comparing said search value with the data to be searched.

6. A data processing system according to claim 5 wherein the data file store comprises at least one disc file unit.

* * * * *